March 6, 1962  R. D. BLANCK ETAL  3,023,526
ADVERTISING DISPLAY DEVICE
Filed Oct. 13, 1958
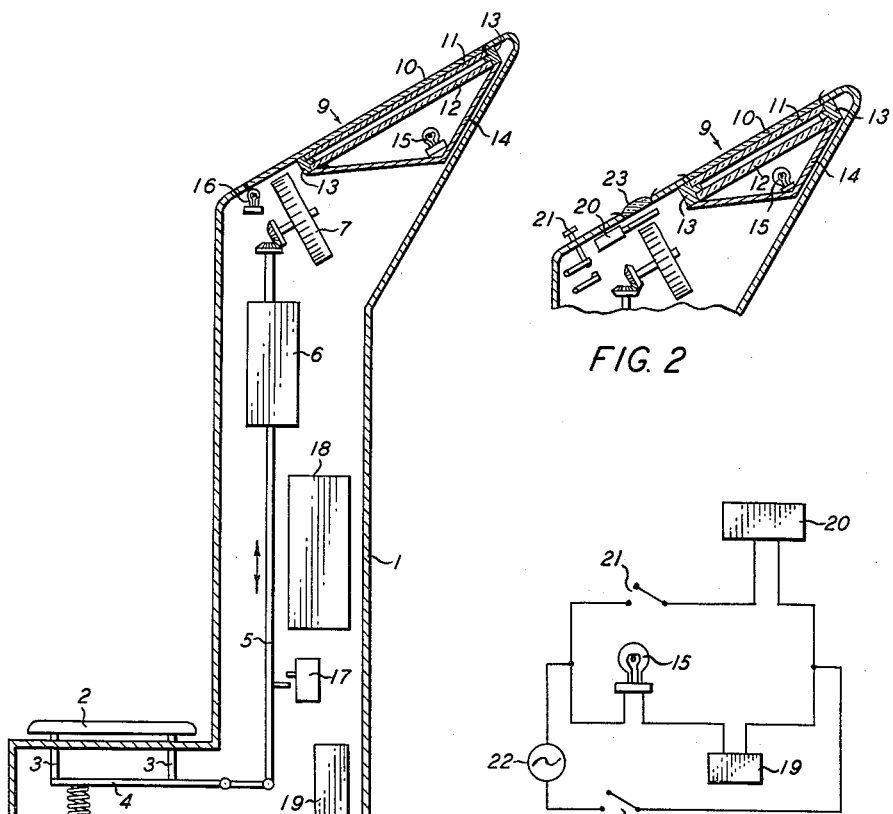
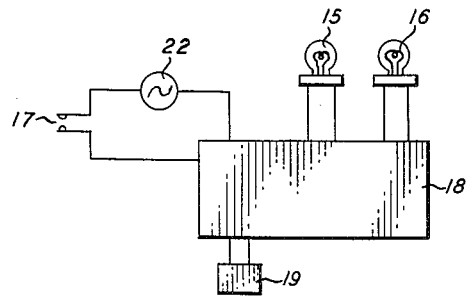
INVENTOR.
Roger D. Blanck
BY William P. Saunders
George W. F. Simmons
ATTORNEY

United States Patent Office 3,023,526
Patented Mar. 6, 1962

3,023,526
ADVERTISING DISPLAY DEVICE
Roger D. Blanck, 1145 Monroe Ave., and William P. Saunders, 149 Crosman Terrace, both of Rochester, N.Y.
Filed Oct. 13, 1958, Ser. No. 766,875
1 Claim. (Cl. 40—219)

Our invention relates in general to an advertising display device and in particular to a weighing device therefor.

The extensive public use of scales has long prompted attempts to utilize such devices to present advertising displays. To date, however, commercial use of this possibility has been largely confined to treating the scale as a billboard. Such a practice is both inefficient and ineffective. The limited size of the scale, the fact that the user's attention is preoccupied with another matter—the determination of his weight—and thereby has his gaze drawn to the area of the device presenting the weight information, combine to make the device merely a scale with incidental advertising attached thereto and thus dependent on the weighing device for revenue.

For over fifty years inventors of varying inguenity have sought to design a scale which would more effectively present an advertising message. These attempts generally have involved ingenious, and often complicated, arrangements of mechanical or electrical timing means whereby the user's weight is concealed for a set time while the advertising is displayed was suggested by Howard in U.S. 859,226, by Viviano in U.S. 1,788,696 and by Wells and Hein in U.S. 2,566,711; moving the display to attract attention was suggested by Turner and Stacks in U.S. 2,001,372, by Crane in U.S. 1,564,831, and by O'Brien and O'Brien in U.S. 1,735,934; and lighting the display for greater attractiveness was suggested by Crane in U.S. 1,640,112.

These devices all have various deficiencies so that they remain primarily scales with an advertising display incidental thereto. In particular, the scales, being placed in public and often unsupervised positions, are often subject to rather hard use and even abuse. Many of the devices suggested for increasing the effectiveness of advertising displays on scales are unduly expensive and complicated with the attendant difficulties of being easily damaged and requiring excessive adjustment and maintenance. Furthermore, the prior art devices are not so efficient psychologically as is necessary for commercial exploitation of the devices. Thus, the weighing mechanism merely draws the user to the scale but does nothing to direct his attention to the advertisement, i.e., there is a minimum of cooperative interaction between the essentially diverse functions of weighing and advertising.

While some of the prior art devices have recognized the desirability of concealing the advertisement prior to the user stepping on the platform, attempts to achieve this have been characterized by a combination of failure and inadequacy. Thus, generally, such attempts rely on the use of a projection system which requires an expensive optical system and an equally expensive and short-lived light means to obtain adequate illumination. Further, the optical system must be frequently cleaned and the light requires frequent replacement. Another approach has been to position the advertising display immediately behind a frosted or sanded glass display panel. However, such a panel, while obscuring the display, does not render it invisible. Thus, the object sought to be achieved is defeated. Even more important, it makes it impossible to view the advertisement in sharp detail when the advertisement is illuminated from behind.

Accordingly, it is an object of our invention to provide a weighing scale wherein means are provided for cooperative interaction between the weighing and advertising functions.

Another object of our invention is to provide a weighing device for displaying advertising with such a degree of efficiency that the device will function primarily as a display device.

Yet another object of the invention is to provide means to direct the attention of the user of the device directly to the display device prior to showing the display.

Still another object of the invention is to provide a platform weighing scale for displaying an advertisement so constructed as to require the minimum of maintenance under conditions of hardest use and at the same time be easily and inexpensively constructed.

Other objects of the invention will become apparent from the following description when read in conjunction with the accompanying drawings—the novel features being pointed out in the claim at the end of the specification.

In the drawings, FIG. 1 is a central sectional view through the cabinet of a device illustrative of the principles of the present invention.

FIG. 2 is a sectional view of the display portion of another embodiment of the invention.

FIG. 3 is a schematic diagram of an electrical control circuit whereby the functions of the invention may be accomplished.

FIG. 4 is a schematic block diagram of another control circuit whereby the functions of the invention may be accomplished.

The machine comprises, in general, a cabinet 1 for a platform scale containing a display portion 9 and a platform 2. The platform 2 is mounted on base 8 and operatively connected by suitable means as rods 3 to beam 4 which is pivotally mounted to actuate pull rod 5. Beam 4 is biased by a suitable means, generally a spring, to reset the scale when the user steps off the platform 2. Pull rod 5 in turn is operatively connected to a standard scale mechanism 6 which includes an indicating means as a suitable dial 7.

Externally, display portion 9 comprises a one-way glass mirror 10. On the interior side of mirror 10 and occupying the major portion of the area of the mirror is a support means for the advertising display 11 as a photographic transparency. Suitable support means comprise a rigid, light-diffusing support sheet 12 as of ground glass with guide means 13 as metal channels positioned and adapted to hold the display 11 closely adjacent to or in contact with mirror 10. The mirror 10 is hinged to provide for periodically changing the display. A ventilated reflector housing 14 having therein illuminating means 15 as a light bulb is positioned to illuminate translucent panel 12.

The remaining portion of the area of the interior side of mirror 10 is devoted to the weight indicating device 7. In the embodiment shown, the weight is indicated at the bottom or lower portion of the one-way mirror 10. However, if desired, it may be located at the top or at either side. The weight indicating means, as the dial 7, is positioned immediately adjacent to the reflector housing 14. Suitable illuminating means as a light bulb 16 are provided for the weight indicating means.

In the operation of the device, the user steps onto the platform thereby activating the scale mechanism 6 and microswitch 17, which in turn connects energy source 22 (generally a 60 cycle, 110 volt line) to light sources 15 and 16 and actuates counter 19. The counter therefore gives an accurate measure of the effectiveness of the device. Thus, the user sees his own image reflected in mirror 10 thereby increasing the effectiveness of the device in attracting users and simultaneously directing their attention to the desired portion of the machine. On actuation by the user thereby activating ligh 15, the user's reflection vanishes and a brightly lighted advertisement presented in its place. Further, the user's weight is not immediately presented to him thus assuring full cognizance of the advertisement. This may be done in a variety of ways. Where the power source, microswitch 17, counter 19 and lights 15 and 16 are wired in series, the necessary delay is obtained by regulating the damping of dial 7 so that its oscillations prevent reading ones' weight for a few seconds until it comes to rest. This is by far the simplest and most dependable means of obtaining the desired result.

An alternative solution is shown in FIG. 2 and by the control circuit illustrated in FIG. 3. In comparison with the simple series arrangement described above, switch 21 and solenoid 20 are in series with each other and in parallel with switch 17, light 15 and counter 19. Once again, on actuation of the scale by the user, his reflection in mirror 10 vanishes to be replaced by an advertisement brightly lighted by lamp 15. However, his weight is concealed behind sight glass 23 by a solenoid actuated shutter 20 which has to be separately actuated by the user depressing button 21. Extra illumination for dial 7 may be dispensed with, reliance being had on the light admitted through sight glass 23. However, lamp 16 may be included, being operated by either switch 17 or 21. If it is desired to use mirror 10 to obscure dial 7 as in FIG. 1, solenoid actuated shutter 20 may be omitted and light 16 substituted therefore in the control circuit shown in FIG. 3. To obtain maximum advertising value, it is desirable to use the bottom of the advertising display for the legend directing the user to depress button 21 to obtain his weight.

Still another embodiment is shown by FIG. 4. Microswitch 17 actuates the timing control device 18. This device in turn actuates the counter 19 and simultaneously activates illuminating means 15 rendering the advertising display 10 visible to the viewer. After a predetermined delay the weight illuminating means 16 is then activated giving the user's weight. If desired, the advertising display may be turned off on the activation of illuminating means 16 or illuminating means 15 and 16 may both stay on. When the user steps off the platform 2 the device is automatically deactivated presenting merely a mirror surface to the casual viewer. The use of timing control device 18 represents the most complex and therefore the least desirable solution as under the conditions of use such a device is most likely to be damaged thereby destroying the effectiveness of the entire device. Thus, by reason of their dependability of operation, ruggedness of construction and lower costs the other delay devices (i.e., other than timing control 18) are preferred.

From this description of the method of operation of the device the flexibility and utility as well as the unique features of the device are at once apparent. Thus, cooperation between weight and display is achieved here by combination of the mirror to direct the user's attention to the desired area and the use of the delay period before revealing the user's weight thereby assuring the user's presence while the display is visible in the area to which his attention has already been drawn. The counter measures the coverage of the display with an accuracy not possible in other advertising media. Further, the device is both rugged, dependable and economical. Thus, absolutely no optical system or projection device is needed. Nor, other than the scale mechanism itself, are there any moving parts. Further, by using simple incandescent lights, the maximum of economy and dependability, along with low cost of operation, are assured.

In general it has been found that to prevent the premature disclosure of the advertising display it is essential that the one-way mirror have a light transmission of no more than about 25%. The lower limit of the light transmission will be determined largely by the luminosity of the illuminating means so long as there is a positive transmission factor. The light-diffusing support sheet is essential to an attractive, high quality display as described herein serving both to support the display and to diffuse the light evenly over its entire surface without lenses or similar means. Thus the display means includes both a ground glass plate and a one-way mirror. The cooperative action of both are essential for an effective and attractive display.

Since it has been pointed out that the particular embodiments described herein are intended for purposes of illustration and are subject to many modifications and variations, the scope of the invention should be considered as limited only by the prior art and the appended claim.

What is claimed is:

In apparatus of the class described a closed cabinet and a one-way mirror having a first zone and a second zone comprising a portion of said cabinet, illuminating means within said cabinet to project light through said first and second zones, time-delay means operatively connected to said illuminating means for said first and second zones, a translucent sheet member positioned and disposed to support a transparent sheet having thereon material to be displayed between said illuminating means and said first zone so that activation of said illuminating means renders said material visible externally from said closed cabinet through said first zone, a weighing mechanism, means for indicating said weight within said cabinet adjacent said second zone so that activation of said illuminating means renders said weight indicating means vsible externally from said closed cabinet through said second zone, a counter and means energized by said counter and said time-delay means in response to activating of said weighing mechanism to cause illumination of said first and second zones in timed sequence.

References Cited in the file of this patent

UNITED STATES PATENTS

| | | |
|---|---|---|
| 1,564,831 | Crane | Dec. 8, 1925 |
| 1,640,112 | Crane | Aug. 23, 1927 |
| 2,490,696 | Marsden | Dec. 6, 1949 |
| 2,565,575 | Rosenthal | Aug. 28, 1951 |
| 2,566,711 | Wells et al. | Sept. 4, 1951 |

FOREIGN PATENTS

| | | |
|---|---|---|
| 357,434 | Great Britain | Sept. 24, 1931 |
| 682,747 | France | June 2, 1930 |